3,377,901
APPARATUS FOR TESTING THE INDIVIDUAL
CONDUCTORS OF CABLES
Edward P. Gurski, Cranford, and John C. Walz, Bloomfield, N.J., assignors to Western Electric Company, Incorporated, New York, N.Y., a corporation of New York
Filed Apr. 8, 1966, Ser. No. 541,372
18 Claims. (Cl. 83—368)

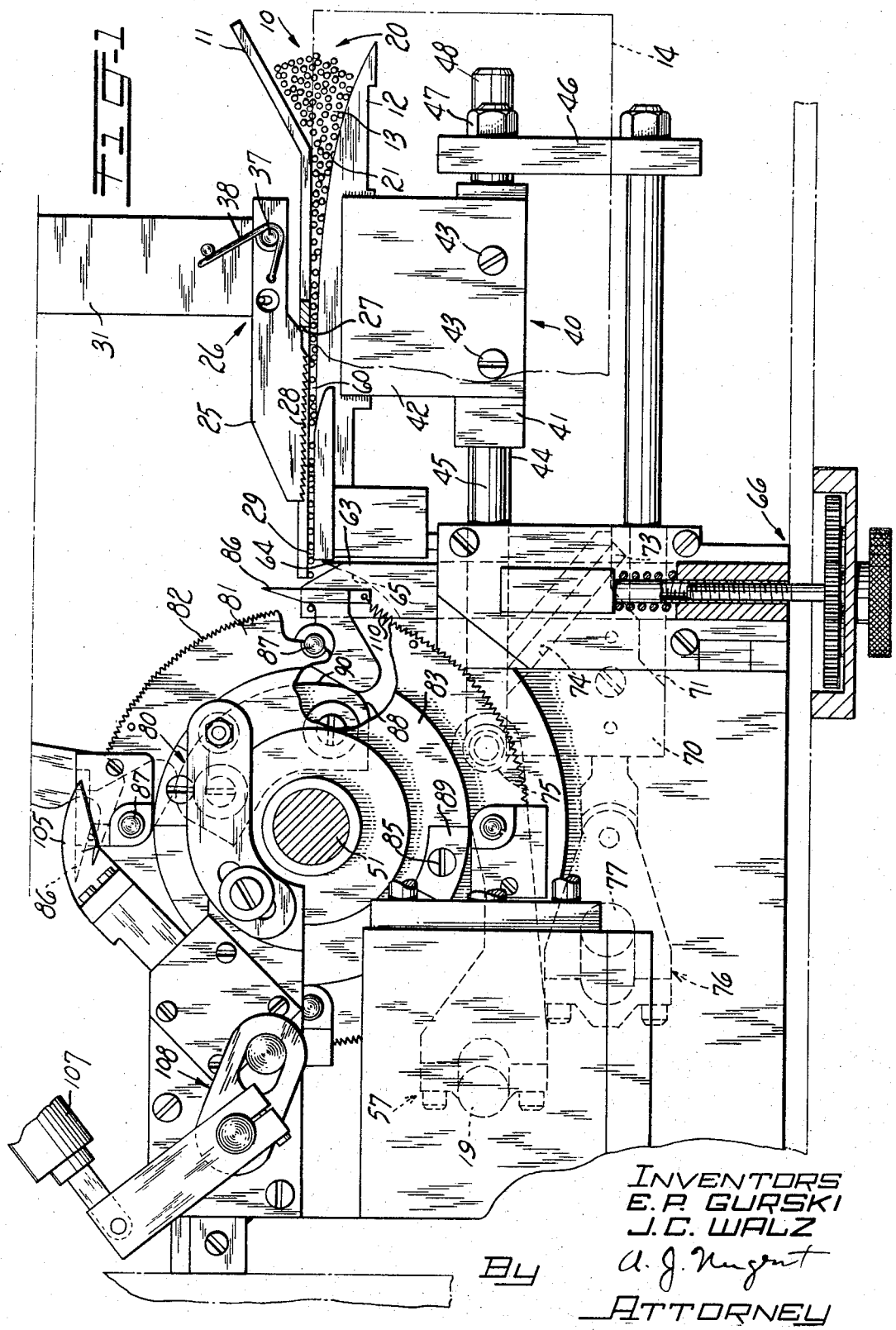

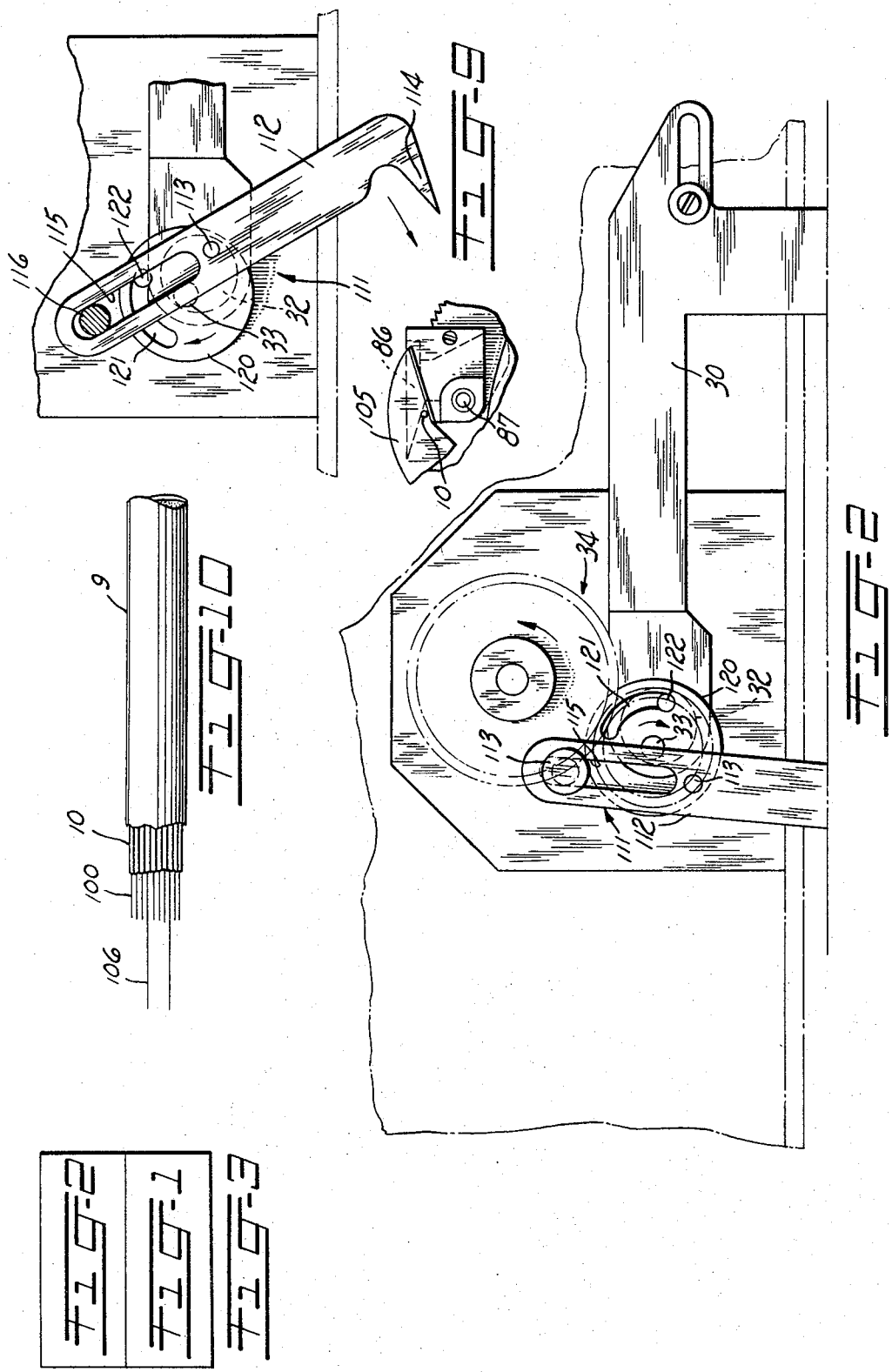

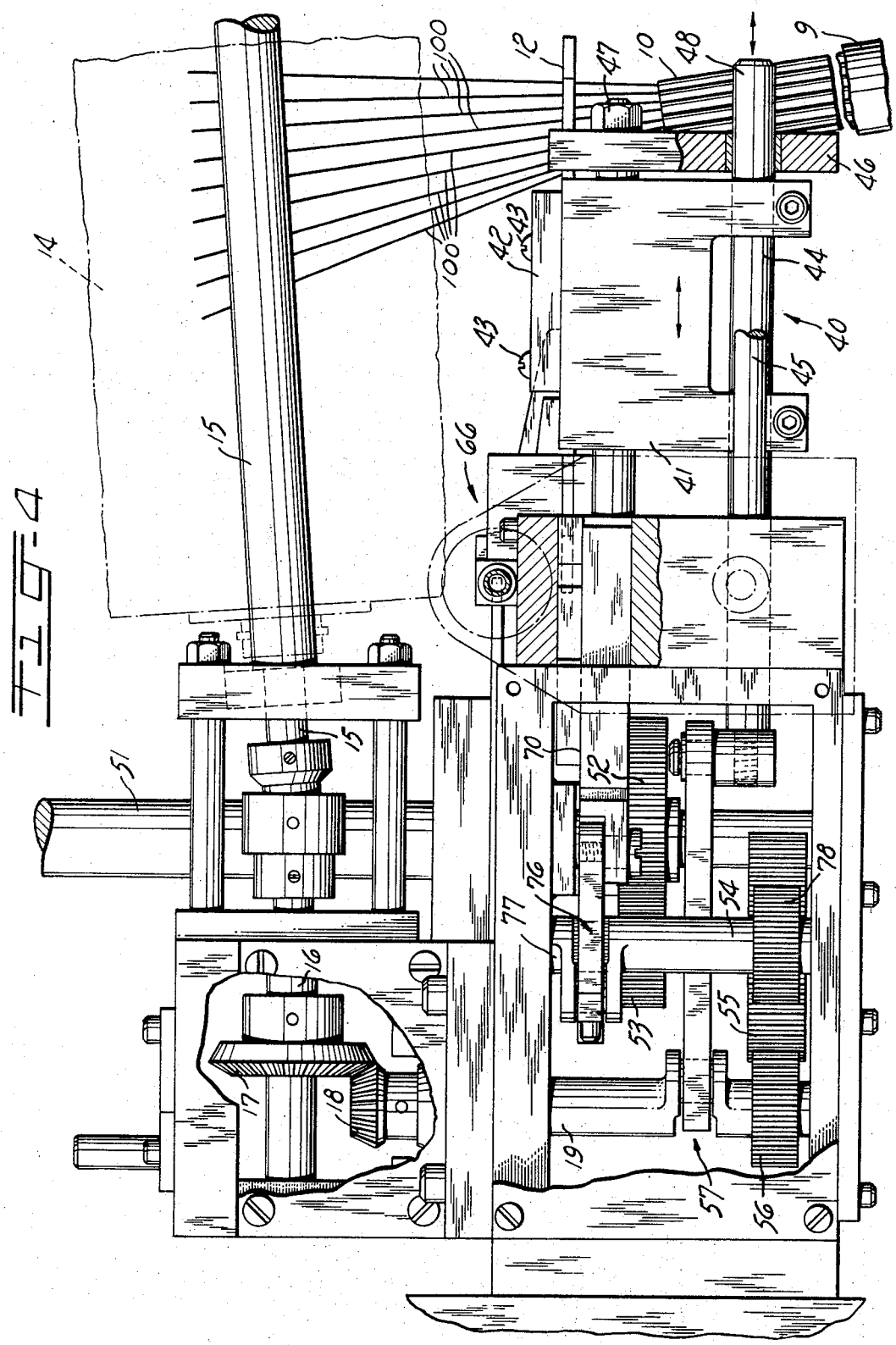

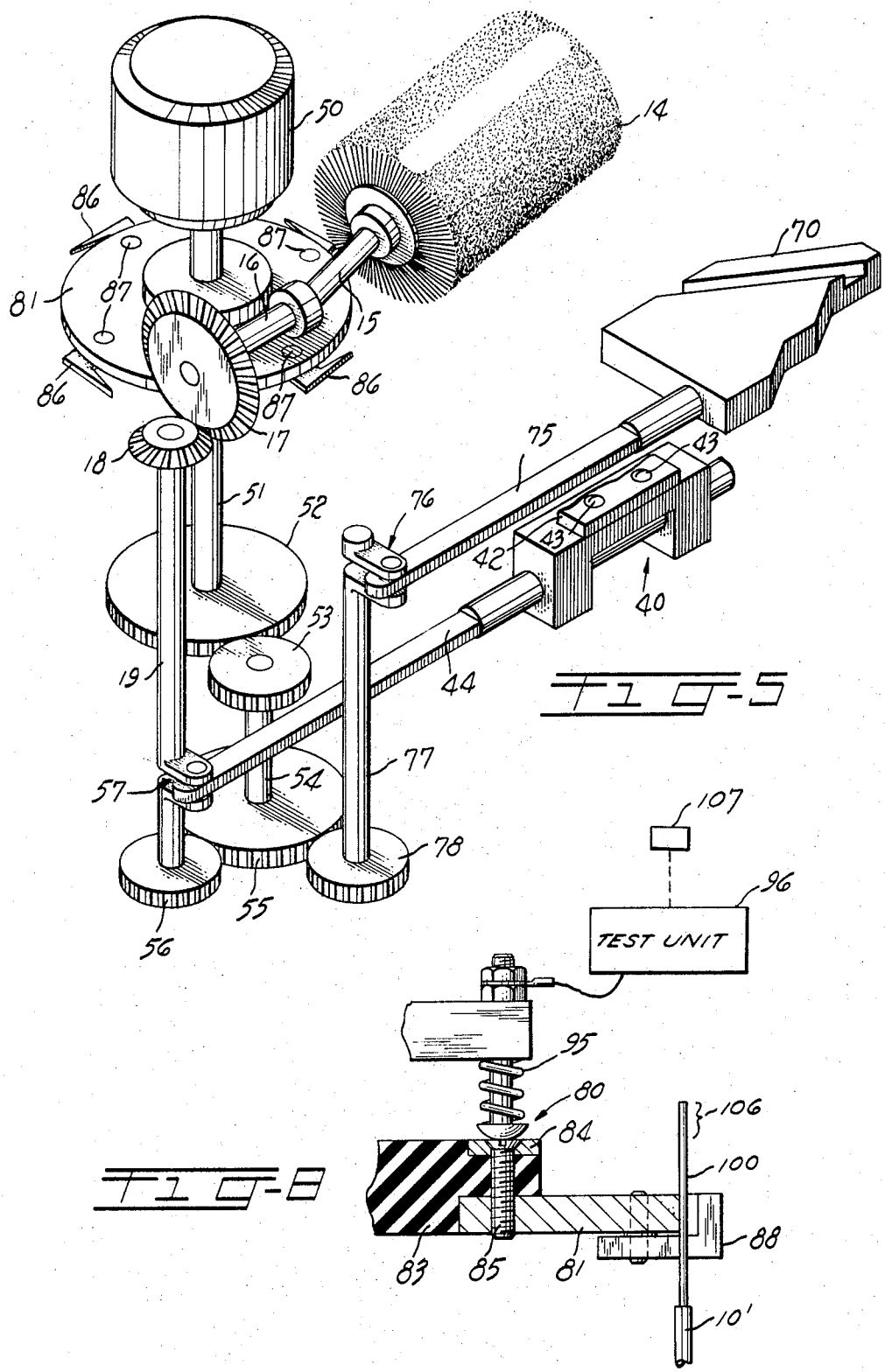

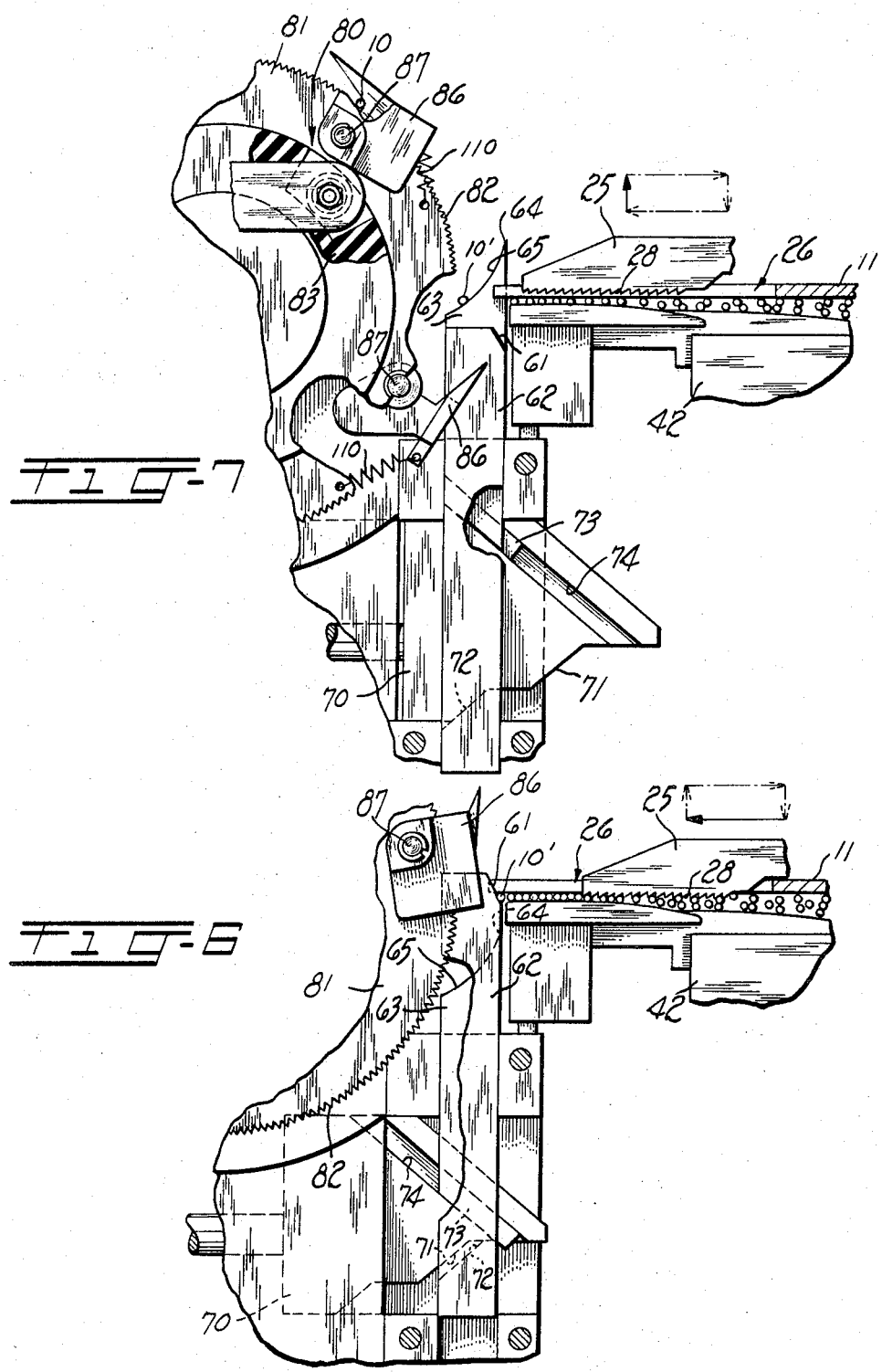

This invention relates to electrical testing apparatus and particularly to apparatus for testing the individual conductors of cables.

In the manufacture of communication cables which include a plurality of individually insulated conductors, each conductor of a cable is tested for continuity and only acceptable cables are shipped to the field. Using present testing methods, an operator manually selects and "rings out" each conductor in a cable. When a defective conductor is encountered, the operator tags the conductor to separate it from the acceptable conductors. In view of the large number of conductors involved, the continuity testing operation may become tedious and time consuming. Furthermore, there is the possibility that an operator may miss one or more conductors during the testing process.

Accordingly, an object of this invention is to provide an apparatus for testing the continuity of a plurality of conductors in a communication cable.

Another object of this invention is to provide an apparatus for rapidly an automatically selecting individual conductors in a communication cable for a testing operation.

Another object of this invention is to provide means operable to select individual conductors in a communication cable and feed them successively to a continuity testing circuit.

A more specific object of this invention is to provide means for automatically fanning out and feeding individual conductors of a communication cable to a means for testing the electrical continuity thereof.

With these and other objects and advantages in view, the present invention contemplates an apparatus for electrically testing conductors, including means for feeding a succession of conductors to a transfer position, means for successively transporting the conductors from the transfer position to a testing position, means mounted at the testing position for electrically testing the conducors, cutting means, and means responsive to the testing means for controlling the operation of the cutting means for cutting the tested conductors which fall into a prescribed category, thereby permitting an easy visual identification thereof with respect to those conductors which fall into a different category.

More specifically, the end portion of a cable is clamped in position on the apparatus and the exposed uninsulated or stripped ends of the conductors are automatically fanned out in a trackway and fed therealong one at a time to a retractable stop. A camming mechanism retracts the stop at the same time as a finger member is raised to separate the leading conductor from the plurality of conductors being advanced along the trackway by the reciprocable member. The leading conductor is guided by the finger to a position where it is picked up by one of a plurality of snaggers mounted on a rotatable wheel. The snagger cams the first conductor against the wheel to hold it securely during movement to a test station where a continuity circuit is completed through the conductor if the conductor is acceptable. A cutting element is operable to trim the stripped end portion of the acceptable conductors to a desired length. On the other hand, if the conductor is found to be defective, a circuit connected to the test set prevents the cutting element from trimming that conductor and, accordingly, after the whole cable is tested, the defactive conductors are readily identifiable by their uncut end portion extending past the other conductors of the cable.

Thus, the invention provides an automatic means for rapidly testing the continuity of a plurality of cable conductors. Furthermore, defective conductors are readily identifiable because of their length and there is no need to tag them. While the invention is described with reference to continuity testing of cable conductors, it is, of course, to be understood that the invention may be used to perform a variety of other electrical tests on cable conductors.

Other objects and advantages of the present invention will become more apparent when considered in conjunction with the following drawings wherein:

FIGS. 1 and 2, when placed adjacent to each other in the manner shown in FIG. 3, show a plan view, in section, of a preferred embodiment of the invention;

FIG. 4 is a side view of the preferred embodiment of the invention with portions of the housing broken away to more clearly show the elements thereof;

FIG. 5 is a showing of the drive train for the preferred embodiment of the invention;

FIGS. 6 and 7 show, in a sequential manner, apparatus for feeding individual conductors to be tested, FIG. 8 shows an electrical test station according to the invention;

FIG. 9 shows a conductor ejecting mechanism according to the invention; and

FIG. 10 shows a cable which has been tested according to the subject invention, with the conductors found to be of one electrical characteristics are clearly distinguishable from those of another.

Referring now to FIGS. 1 and 2 of the drawings, a plurality of conductors 10 of a cable 9 are positioned intermediate a stationary plate 11 and a reciprocable member 12 spaced from the stationary plate. The conductors are fanned out in a trackway 13, defined by the spaced plate and reciprocable member, by the operation of a rotating brush 14 (FIGS. 4 and 5). The brush is connected to a shaft 15 which is connected to linkage 16 and bevel gears 17, 18 which are driven by a shaft 19.

The reciprocable member 12 moves back and forth to feed the conductors 10 along the trackway 13 from the entrance end 20 thereof, along a tapered portion 21 of reciprocable member 12 to a feeder 25 which is driven by an eccentric mechanism, generally referred to as 26. The feeder 25 projects through an opening 27 of stationary plate 11 and is provided with teeth 28 for engaging the conductors to advance them to the exit end 29 of trackway 13.

The eccentric mechanism 26 for driving feeder 25 includes arms 30 and 31 which are driven by an eccentric 32 connected to a shaft 33 which, in turn, is driven by a drive unit 34. The feeder 25 is mounted on the arm 31 by means of a pin 37, the feeder being urged downwardly towards the conductors by a spring 38 during the forward movement of the eccentric mechanism. As a result of the movement of the eccentric 32, during an operating cycle, the feeder 25 moves forward to engage the conductors, advances the conductors linearly, then retracts from the conductors and moves back to its original position.

The reciprocable member 12 is driven by a carriage 40. A bracket 41 mounted to a carriage member 42 by screws 43, is supported on an eccentrically driven shaft 44 and is also slidable along a guide rod 45 which extends in parallel relationship over the driven shaft 44. A mounting plate 46 is provided for holding shaft 44 and rod 45, which is secured by bolts 47 and 48, respectively.

As best seen in FIG. 5, the carriage shaft 44 is driven by a motor 50 through a shaft 51, gear 52, gear 53, shaft 54, gear 55, and gear 56 which drives the shaft 19 coupled to an eccentric 57 connected to said carriage shaft. Since carriage member 42 is connected to the reciprocable member 12, this arrangement also permits reciprocating movement of said member to assist in the fanning out of the conductors in cooperation with brush 14 and the feeding of the conductors in cooperation with the feeder 25.

In general, the conductors 10 are fed forward along trackway 13 (FIG. 1) which tapers to a relatively narrow slot 60 having a diameter slightly larger than the diameter of a conductor to permit the feed of individual conductors therethrough. As seen in FIG. 1, the feeder 25 is in its rearward position, ready to move downwardly and forward to engage the conductors and feed them to the left. As seen in FIG. 6, the feeder 25 is in its foremost position and in contact with the conductors, the leading conductor 10' being in contact with an inclined slope 61 of a vertically movable reciprocable stop 62. Finally, as seen in FIG. 7, the feeder 25 is shown out of contact with the conductor and ready to retract and return to its normal starting position.

As best illustrated in FIG. 6, after a leading conductor 10' has been fed along trackway 13 to the stop 62, the stop retracts so as to release the leading conductor. Simultaneously, a vertically movable finger 63 having a pointed end portion 64 contiguous with an arcuate surface 65 thereof is advanced upwardly to pick off the conductor 10', its arcuate surface camming the conductor to a transfer position, as best seen in FIG. 7.

The simultaneous opposing movements of the stop 62 and finger 63 are controlled by a cam 70 having an irregularly inclined surface 71 for engaging a surface 72 of the stop, and for moving end projection 73 of the finger 63 along a slotted portion 74 disposed within the cam. As seen in FIGS. 1 and 5, cam 70 is driven through a shaft 75, eccentric 76, shaft 77 and a gear 78 in mesh with gear 55. Thus, as best seen in FIG. 6, when cam 70 is driven to the right, cam surface 71 engages the stop surface 72 to cause the stop 62 to retract and, simultaneously, cam finger projection 73 travels along slotted portion 74 to cause the finger 63 to move upwardly to pick off the lead conductor 10'. The relative position of the aforementioned structure, when the cam has completed this movement, is illustrated in FIG. 7, the conductor 10' now being located in a desired position for further transfer to a test area 80. It is to be noted that the stop 62 is provided with adjustable means, generally indicated at 66 (FIG. 1), for adjusting the position of the stop so as to accommodate conductors of various size diameters.

As seen in FIGS. 1 and 2, a conductive wheel 81 having a serrated periphery 82 and an inner insulating hub 83 is connected to the main drive shaft 51. The hub is provided with a plurality of conducting contact shoes 84, each being connected to the hub 83 by a screw 85. A plurality of spring-loaded, tapered snaggers 86 also are pivotably mounted to the wheel 81 by pins 87 being insulated from each other by hub 83. As the wheel 81 rotates (FIG. 1), a snagger 86 picks off the conductor 10' at the position transferred thereto by finger 63. During this movement, a snagger surface 88 engages an arcuate cam surface 90 causing the snagger to pivot counterclockwise and clamp the conductor 10' into one of the peripheral serrations 82 of the wheel 81.

The conductor 10' is transported in this clamped position to the test area 80, whereat, as best seen in FIGS. 7 and 8, contact shoe 84 engages a spring-loaded plunger 95 for making electrical contact with a suitable test unit 96. A circuit is completed from the test set to the conductor 10' through the spring-loaded plunger 95, contact shoe 84, screw 85 and wheel 81 to the stripped end portion 100 of the conductor.

As seen in FIG. 1, a cutting blade 105 is provided at a desired distance from the test area 80 and is disposed in a normally extended cutting position. In the event a conductor tested is acceptable, the test unit will not cause the cutter to move from its normally extended position and, thus, when the acceptable conductor is moved into the path of the cutter, it is trapped between the cutter and the snagger thereby resulting in an extended segment 106 of the stripped end portion 101 of the conductor being severed (FIG. 10). However, in the event the conductor tested is unacceptable, the test unit 96 causes a solenoid 107 to operate linkage 108 to retract the cutter 105 from its normally extended position out of the path of the tested conductor thereby preventing the cutting of the extended segment 106 of the conductor. In this manner, as seen in FIG. 10, after all the conductors of a cable have been tested, one can readily identify the unacceptable conductors by visually observing their uncut extended segments 106.

After a tested conductor is moved past the cutter 105, the surface 88 of the snagger 86 departs from the cam surface 89 thereby causing a spring 110 (FIG. 7) to pivot the snagger clockwise to unclamp the tested conductor from the wheel 81. Simultaneously, as seen in FIGS. 1, 2, and 9, an ejection mechanism 111 which includes an ejector arm 112 connected to a locking pin 113 of the eccentric mechanism 32 is operated to positively remove the tested conductor from the snagger. The ejector arm 112 includes a hook-like portion 114 at one end for engaging and removing the tested conductor from the snagger and an elongated slot 115 at the other end for receiving a fixed stud 116 for controlling the path of travel of the ejector arm. Thus, upon rotation of the eccentric mechanisms 32, operating in timed relationship with the feeding and testing cycles of the apparatus, the hook-like portion 114 sweeps in and grasps the tested conductor from the snagger, removing it from the apparatus. It should be noted that pin 113 is connected to a disc 120 which is also driven by shaft 33. The disc is provided with an arcuate slot 121 for receiving an adjustable screw 122 for controlling the desired motion to be imparted to the ejector arm.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. Apparatus for electrically testing conductors, including:
   means for feeding a succession of conductors to a transfer position,
   means for successively transporting the conductors from the transfer position to a testing position,
   means mounted at the testing position for electrically testing the conductors,
   cutting means, and
   means responsive to the testing means for controlling the operation of the cutting means for cutting the tested conductors which fall into a prescribed category, thereby permitting an easy visual identification thereof with respect to those conductors which fall into a different category.

2. Apparatus for testing conductors, according to claim 1, wherein the feeding means includes:
   a first member,
   a second member disposed in spaced, opposing relationship with respect to the first member and movable with respect thereto,
   the spaced first and second members defining a trackway therebetween, the trackway being of sufficient size at its entrance end so as to be capable of receiving a plurality of randomly disposed conductors therein, the trackway converging to a relatively smaller size at its exit end, for passing successive individual conductors therethrough, and the second member being operable, upon movement thereof with respect to the first member, to feed the randomly oriented conductors one at a time toward the exit end of the trackway.

3. Apparatus for testing conductors according to claim 2, wherein:

the first member has an aperture therein, and a serrated member extends through the aperture into said trackway for engaging the conductors therein, an eccentric mechanism, said serrated member being driven by the eccentric mechanism such that its movement includes a forward stroke wherein the conductors are engaged by the serrated portion of the serrated member and driven toward the exit end of the trackway.

4. Apparatus for electrically testing conductors of cables, which comprises:

means for feeding a succession of conductors to a transfer position, which means includes:

a first member, a second member disposed in spaced, opposing, relationship with respect to the first member and movable with respect thereto, the spaced first and second members defining a trackway therebetween, the trackway being of sufficient size at its entrance end so as to be capable of receiving a plurality of randomly disposed conductors therein, the trackway converging to a relatively smaller size at its exit end for passing successive individual conductors therethrough, the second member being operable, upon movement thereof with respect to the first member, to feed the randomly oriented conductors one at a time toward the exit end of the trackway, and gating means mounted adjacent the exit end of the trackway for positively feeding conductors one at a time from the exit end of the trackway to the transfer position, means for successively transporting the conductors from the transfer position to a testing position, means mounted at the testing position for electrically testing the conductors, cutting means, and means responsive to the testing means for controlling the operation of the cutting means for cutting the tested conductors which fall into a prescribed category thereby permitting an easy visual identification thereof with respect to those conductors which fall into different categories.

5. Apparatus for testing conductors according to claim 4, wherein said gating means includes:

stop means mounted adjacent the exit end of the trackway and movable from a first position, where it blocks off said exit end, to a second position where it does not block off said exit end, finger means mounted adjacent the exit end of the trackway and movable from a first position, where it is spaced from the exit end of the trackway, to a second position where it is operable to receive a conductor from the exit end of the trackway and transport it to the transfer position, the finger means being shaped such that it closes off the exit end of the trackway after picking up a single conductor therefrom, a cam mounted on both the stop means and the finger means, and driving means connected to the cam means and operable to drive it such that the stop means and finger means are simultaneously moved from their first positions to their second positions wherein the stop means unblocks the exit end of the trackway, allowing a single conductor to be passed therethrough and be picked up by the finger means and transported thereby to the transfer position.

6. Apparatus for electrically testing conductors which comprises:

means for successively feeding a plurality of conductors to a transfer position, a rotatable member mounted with at least a portion thereof adjacent the transfer position, at least one snagger element mounted on the rotatable member operable to pick up a conductor located at the transfer position, means for driving the rotatable member such that the snagger is brought opposite the transfer position to pick up a conductor thereat and transfer it to a testing position, means mounted at the testing position for electrically testing the conductors, cutting means, and means responsive to the testing means for controlling the operation of the cutting means for cutting the tested conductors which fall into a prescribed category, thereby permitting an easy visual identification thereof with respect to those conductors which fall into a different category.

7. Apparatus for testing conductors according to claim 6, wherein:

the snagger is pivotally mounted on the rotatable member, being pivotable from an extending, pick up, position to a clamping, transporting position, and cam means are mounted on the rotatable means operable to pivot the snagger from its extended position to its clamping position when it passes the transfer position and picks up a conductor.

8. Apparatus for testing conductors, according to claim 6, wherein the feeding means includes:

a first member, and a second member disposed in spaced, opposing, relationship with respect to the first member and movable with respect thereto, the spaced first and second members defining a trackway therebetween, the trackway being of sufficient size at its entrance end so as to be capable of receiving a plurality of randomly disposed conductors therein, the trackway converging to a relatively smaller size at its exit end for passing successive individual conductors therethrough, and the second member being operable, upon movement thereof with respect to the first member, to feed the randomly oriented conductors one at a time toward the exit end of the trackway.

9. Apparatus for testing conductors according to claim 8, wherein gating means are provided for positively feeding the conductors individually through the exit end of the trackway.

10. Apparatus for testing conductors according to claim 9, wherein said gating means includes:

stop means mounted adjacent the exit end of the trackway and movable from a first position, where it blocks off said exit end, to a second position where it does not block off said exit end, finger means mounted adjacent the exit end of the trackway and movable from a first position, where it is spaced from the exit end of the trackway, to a second position where it is operable to receive a conductor from the exit end of the trackway and transport it to the transfer position, the finger means being shaped such that it closes off the exit end of the trackway after picking up a single conductor therefrom, a cam mounted on both the stop means and the finger means, and driving means connected to the cam means and operable to drive it such that the stop means and finger means are simultaneously moved from their first positions to their second positions wherein the stop means unblocks the exit end of the trackway, allowing a single conductor to be passed therethrough and be picked up by the finger means and transported thereby to the transfer position.

11. Apparatus for testing conductors according to claim 10, wherein:
a plurality of snaggers are mounted on the rotatable member in predetermined, spaced positions along the periphery thereof, and
driving means for the rotatable member and the driving means for the cam member are coordinated such that a conductor is gated through the exit end of the trackway as a snagger is rotated opposite thereto.

12. Apparatus for electrically testing conductors according to claim 6, wherein:
the cutting means comprises a blade mounted adjacent the rotatable means and pivotable from a first position, where it is in the path of a conductor held by a snagger, to a second position where it is out of said path.

13. Apparatus for electrically testing conductors according to claim 1, wherein the testing means comprises a circuit for testing the continuity of the individual conductors transported thereto.

14. Apparatus for electrically testing conductors according to claim 12, wherein:
the testing means comprises a circuit for testing the continuity of the individual conductors, and
the means responsive to the testing means comprises a solenoid connected to both the test circuit and the pivotable cutter, wherein the cutter is pivoted out of the path of the conductor by actuation of the solenoid by the test circuit if the conductor fails the continuity test, and left in the path of the conductor if the latter passes the continuity tes.

15. Apparaus for testing conductors according to claim 2, wherein:
a rotatable brush is disposed at the entrance end of the trackway to fan out the randomly oriented conductors thereat and urge the fanned conductors toward the exit end of the trackway.

16. Apparatus for electrically testing conductors according to claim 7, wherein:
the cutting means comprises a blade mounted adjacent the rotatable means and pivotable from a first position, where it is in the path of a conductor held by a snagger, to a second position where it is out of said path.

17. Apparatus for electrically testing conductors according to claim 7, wherein:
the cam means mounted to the rotatable member is further operable to pivot the snagger from its clamping position to its extended position after the snagger passes the cutting means, and
means operatively connected to the rotatable member driving means are provided for ejecting the conductors from the snaggers as the snagger passes the cutting means and is pivoted to its extended position.

18. Apparatus for electrically testing conductors according to claim 17, wherein:
the means for ejecting the conductors from the snaggers comprises:
an arm having a hook-like portion at one end operable to be pivoted past the snagger wherein the hook-like portion engages the conductor held in the snagger and ejects it therefrom.

References Cited
UNITED STATES PATENTS

| | | | |
|---|---|---|---|
| 1,958,655 | 5/1934 | Basso | 83—360 |
| 2,382,922 | 8/1945 | Spillman. | |
| 2,856,998 | 10/1958 | Hancock | 83—411 X |
| 2,929,289 | 3/1960 | Gorecki | 83—411 |
| 3,073,446 | 1/1963 | Wilson et al. | 209—81 |

ANDREW H. JUHASZ, *Primary Examiner.*